United States Patent [19]

Salmon

[11] Patent Number: 4,657,271

[45] Date of Patent: Apr. 14, 1987

[54] VEHICLE STEERING SYSTEM

[76] Inventor: Michael E. Salmon, 2622 Makin, Flint, Mich. 48504

[21] Appl. No.: 749,001

[22] Filed: Jun. 26, 1985

[51] Int. Cl.$^4$ ............................................. B62D 9/02
[52] U.S. Cl. .................................. 280/95 R; 280/675
[58] Field of Search .................. 280/95 R, 95 A, 675, 280/664, 660

[56] References Cited

U.S. PATENT DOCUMENTS

| 2,852,268 | 9/1958 | Johnson | 280/95 R |
| 3,105,699 | 10/1963 | Peras | 280/665 |
| 4,159,128 | 6/1979 | Blaine | 280/95 R |
| 4,522,418 | 6/1985 | Struck | 280/675 |

FOREIGN PATENT DOCUMENTS

| 366880 | 12/1920 | Fed. Rep. of Germany | 280/95 R |
| 528173 | 6/1955 | Italy | 280/664 |
| 416635 | 9/1934 | United Kingdom | 280/95 R |
| 515974 | 12/1939 | United Kingdom | 280/95 R |

Primary Examiner—John J. Love
Assistant Examiner—Everett G. Diederiks, Jr.
Attorney, Agent, or Firm—Burton, Parker & Schramm

[57] ABSTRACT

A steering system for a vehicle having a pair of levers pivotably affixed to the chassis connecting the output of the steering gear mechanism, to tie rods which connect to the wheel assembly steering input. The steering system minimizes the space required for steering linkage.

14 Claims, 2 Drawing Figures

VIEW FROM FRONT OF CAR

VIEW FROM FRONT OF CAR

VEHICLE STEERING SYSTEM

FIELD OF INVENTION

The present invention relates to the field of vehicle steering systems and more particularly to vehicles having a pair of steerable wheels and a linkage connecting the steering gear mechanism to the wheel assemblies.

BACKGROUND OF INVENTION

Steerable vehicles, particularly automobiles and the like, have traditionally employed a steering linkage to connect the steering gear mechanism to a pair of steerable wheel assemblies. While quite simple at first glance, there are a number of engineering problems, most of which are caused by movement of the wheel assemblies relative to the chassis, i.e., the steering movement, jounce and rebound, and chassis roll. The steering system, therefore, has to be designed to take into consideration bump steer effects, Acherman steering characteristics, roll steering effects and the steering linkage space requirement. Furthermore, it is desirable to have steering systems in which the steering characteristics, particularly steering ratio, may be changed with a minimum number of new parts.

In the case of vehicles having a rack and pinion steering gear mechanism, it was frequently necessary to change rack and pinion if one wished to change the steering ratio. Vehicles having a rack and pinion steering gear mechanism generally require the rack and pinion to be located between the steered wheels which frequently causes space and interference problems with the vehicle's engine.

SUMMARY OF INVENTION

I have disclosed a steering linkage for a vehicle having a steering gear mechanism coupled to a pair of steerable wheels. The linkage comprises a pair of levers having a fulcrum axis and a first and second pivot spaced therefrom. The levers are pivotably attached to the chassis adjacent each wheel assembly so that they may be rotated about the fulcrum axis. The first pivot point of each lever is connected to the steering gear mechanism and a second point of each lever is connected to the steering input point of the wheel assembly. The resulting steering system can achieve desirable steering geometry and make maximum use of vehicle space.

BRIEF DESCRIPTION OF THE PREFERRED EMBODIMENTS

Figure 1:
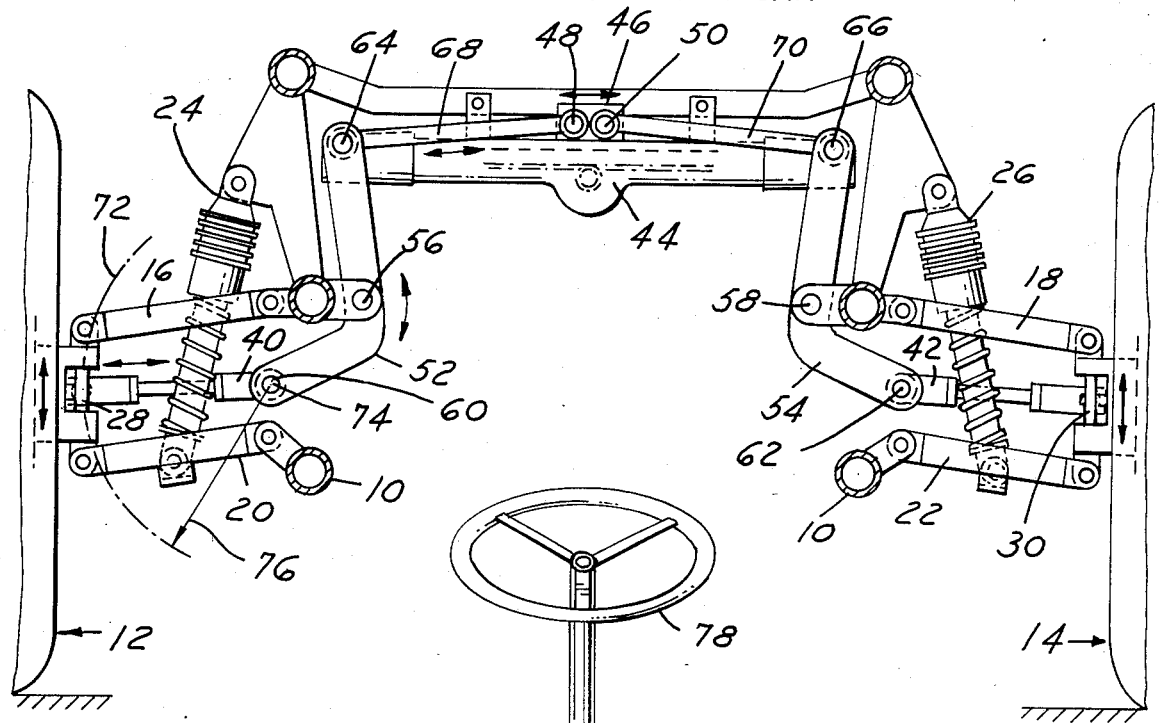
FIG. 1 is a front cross-sectional view of a vehicle having a steering system built according to this invention.
Figure 2:
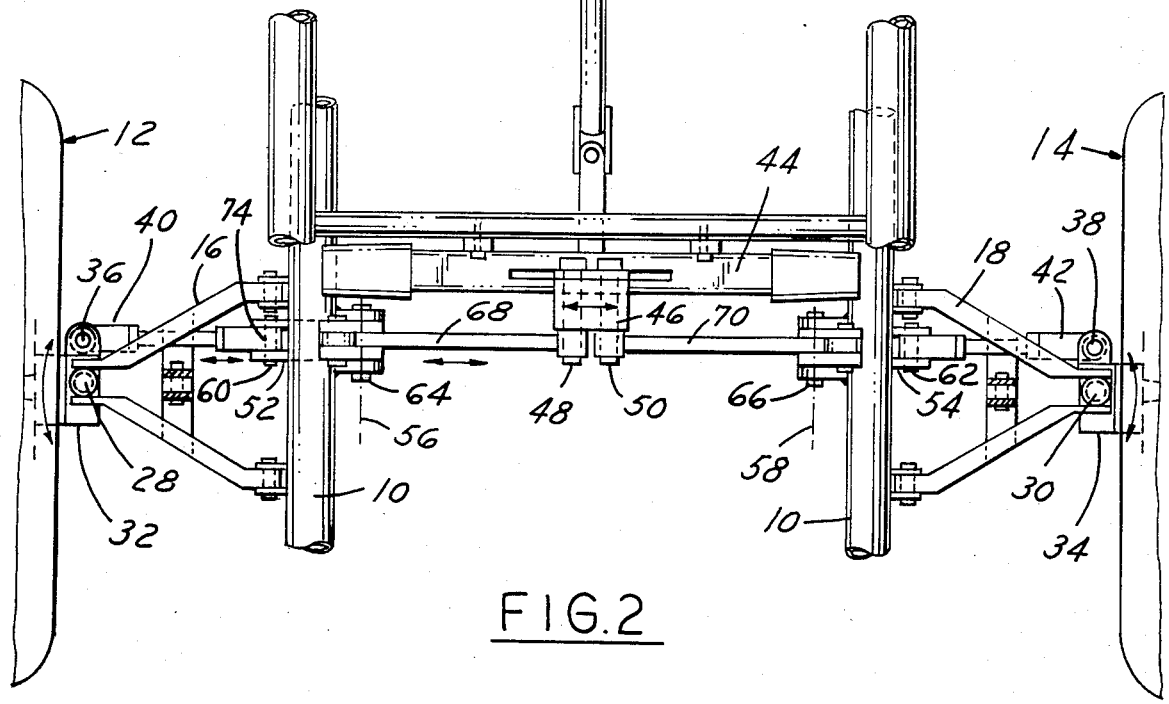
FIG. 2 is a plan view of the steering system shown in FIG. 1.

With reference to the drawings, a preferred embodiment of the invention will be described in detail. FIGS. 1 and 2 show a portion of a vehicle chassis 10 having a right and left wheel assembly 12 and 14 connected to the chassis by upper control arms 16 and 18 and lower control arms 20 and 22. (The right side of the vehicle is with reference to the occupant and is the left side in FIGS. 1 and 2.) The upper and lower control arms shown in the preferred embodiment are a pair of similarly shaped wishbone members of conventional design. Spring-over shock absorber members 24 and 26 are pivotably attached to the chassis at the upper end and pivotably attached to the lower control arm at the lower end in a conventional manner.

The outboard ends of the upper and lower control arms are connected by king pins 28 and 30 on the right and left side, respectively. The king pin in the preferred embodiment is designed to be of a length so that the control arms are substantially parallel. Spindle assemblies 32 and 34 pivotably cooperate with king pins 28 and 30 for rotation about the king pin axis. Although the preferred embodiment employs king pins, a balljoint system would function equally as well. The right and left spindle assemblies are each provided with a steering input point 36 and 38 which is radially spaced from the king pin axis and serves as a means for pivotable attachment of the right and left tie rods 40 and 42.

The preferred embodiment of the invention as shown employs as a steering gear mechanism a rack and pinion assembly 44. Many types of steering gear mechanisms can be used and the term "steering gear mechanism" shall be broadly defined to encompass any mechanical device which has an output point which moves in response to a steering input from the occupant. In the case of rack pinion 44 shown, the output is provided by output block 46 which translates horizontally along an axis generally perpendicular to the vehicle centerline. Output block 46 is provided with right and left output block attachment points 48 and 50. Rather than directly connecting the steering gear output to the steering input point on the spindle assembly, the invention employs a pair of levers 52 and 54 in the steering linkage. Each lever has a fulcrum axis 56 and 58 extending therethrough and first pivot points 64 and 66 and second pivot points 60 and 62, both of which are radially spaced from their respective fulcrum axis. The first pivot point of the levers is connected to the output steering gear mechanism by suitable connection means such as links 68 and 70. The second pivot point of the levers are pivotably connected to the wheel assembly steering input points 36 and 38 by tie rods 40 and 42.

As the occupant of the vehicle rotates steering wheel 78 clockwise in a right turn maneuver, steering gear output block 46 moves toward the right side of the vehicle causing links 68 and 70 to shift to the right rotating levers 52 and 54 about their respective fulcrum axes. As the levers rotate, the second pivot point on the right lever would move inwardly while the second pivot point on the left lever would move outwardly, causing the wheel assemblies to rotate clockwise in unison about their king pin axis.

The ratio of the radial distance of the first pivot point from the fulcrum axis to the second pivot point from the fulcrum axis establishes a lever ratio. Varying the lever ratio by changing the lever or moving the pivot point to an alternative location, will result in a change in the steering ratio. It is therefore very easy and inexpensive to change the steering ratio in vehicles employing this conversion and a rack and pinion steering gear mechanism.

As the wheel assembly moves up and down in jounce and rebound relative to the chassis, the steering input point 36 moves along an arcuate path 72 having a locus 74 and a bounce radius 76. The position of the locus of the arcuate path as well as the effective radius of the arc will be determined by control arm length geometry. In order to minimize bump steer, which is the rotation of the wheel assembly about the king pin axis caused by jounce and rebound independent of steering wheel motion, the second pivot points of the levers are located in the general proximity of the locus of the arcuate path. As the wheels move up and down in jounce and rebound, the tie rods go through significant rotation relative to the lever, but the levers and the links do not move. Due to the short length of the tie rods, their motion does not interfere with the portion of the vehicle inboard of the chassis rails, which is typically used as an engine compartment, luggage area or a foot well.

Since the links do not move during jounce and rebound they have a very limited travel which occurs during steering. The links will move within a small elongated envelope as the links travel during steering maneuvers. The small size of the link motion envelope allows the space in the close proximity of the link to be utilized without coming in contact with the link in vehicle operation. As it will be readily apparent from a review of FIG. 1, as output block 46 translates from side to side, one end of links 68 and 70 will likewise move a horizontal axis with the opposite ends of the links which are attached to the levers moving along an arcuate path. Links 68 and 70 will therefore rotate very slightly about pivotable attachment points 48 and 50 while translating. By locating the levers 52 and 54 adjacent each wheel assembly, the entire central portion of the vehicle located generally between the frame rails is unobstructed.

In the preferred embodiment of the invention shown, both fulcrum axes are horizontal and parallel to one another and the vehicle's central line. The first pivot points move in an arcuate path as the levers rotate about the fulcrum axis and in the embodiment shown the first pivot points will move in a common reference plane which is perpendicular to the fulcrum axis. Preferably, the steering mechanism output, as well as the links which connect the output to the first pivot points will also lie in the reference plane so that the envelope which defines the boundaries of the link movement will be a small tubular shape. The fulcrum axis may however be oriented in a variety of different angles depending upon the intended location of the steering gear mechanism relative to the wheel assemblies. If the steering gear, for example, is sought to be located a great distance rearward of the wheel assembly, the fulcrum axis could be oriented vertically.

While the drawings show a generally L-shape or bell crank shape lever, the lever likewise can be formed in a variety of alternative shapes. The actual lever shape will vary depending upon the space limitations and a desired steering geometry. While not shown or described, it is envisioned that a vehicle employing this invention would have a suspension system designed with some caster and king pin inclination. As caster and king pin inclination are design parameters very well understood by suspension designers and engineers, these features are not described in the specification. For the purpose of simplicity, the vehicle shown in the drawings has no significant caster or king pin inclination so that the effect of the claimed invention on the motion of the suspension parts would be more clearly described and understood.

It is also understood, of course, that while the form of the invention herein shown and described constitutes a preferred embodiment of the invention, it is not intended to illustrate all possible forms thereof. It will also be understood that the words used are words of description rather than words of limitation, and the various changes may be made while not departing from the spirit and scope of the invention disclosed.

I claim:

1. In a vehicle having a steering gear mechanism with an occupant controlled output, and a pair of steerable wheel assemblies each rotatable about a steering axis and each having a steering input point radially spaced from said steering axis, the wheel assemblies being suspended from the vehicle chassis by control arm means allowing movement in jounce and rebound relative to the vehicle chassis causing the steering input point to move along a generally arcuate path defining a center of curvature and a bounce radius; a steering linkage comprising, in combination:

a pair of levers each having a fulcrum axis extending therethrough and a first and second pivot point spaced radially therefrom on generally opposite sides of the fulcrum axis from one another;

means pivotally connecting the levers at their fulcrum axes to the chassis adjacent each wheel assembly so as to allow the wheel to move and jounce in rebound without moving the fulcrum axis location;

link means connecting the output of the steering gear mechanism to the first pivot point of each lever, said link means comprising at least one link pivotably connected to the output of the steering gear mechanism at one end and extending generally transversely therefrom to pivotably connect with said lever first pivot point, said link and said lever arranged in a generally perpendicular manner so that link motion will be confined within a small tubular-shaped envelope; and a pair of tie rods each pivotably connecting the steering input point of a respective wheel assembly to a corresponding lever second pivot point, said second pivot point being located in the proximity of the center of curvature of the arcuate path of the wheel assembly steering input point and said tie rod being substantially the length of the bounce radius so as to minimize bump steer.

2. The invention of claim 1 wherein said levers are oriented so that their first pivot points are substantially above the second pivot points to allow the steering gear mechanism to be located significantly above the center of the wheel assemblies.

3. The invention of claim 1 wherein said fulcrum axes lies on a plane substantially parallel to the vehicle centerline.

4. The invention of claim 3 wherein said fulcrum axes are substantially horizontal.

5. The invention of claim 4 wherein said levers, tie rods and links all lie in a common plane.

6. The invention of claim 5 wherein said plane is generally perpendicular to the vehicle center line.

7. The invention of claim 2 wherein said fulcrum axes are generally horizontal.

8. In a vehicle having a steering gear mechanism with an occupant controlled output, and a pair of steerable wheel assemblies each rotatable about a steering axis and each having a steering input point radially spaced from said steering axis, the wheel assemblies being suspended from the vehicle chassis by control arm means allowing movement in jounce and rebound relative to the vehicle chassis causing the steering input point to move along a generally arcuate path defining a center of curvature and a bounce radius; a steering linkage comprising, in combination:

a pair of elongated, generally L-shaped levers each having a central fulcrum axis and a first and second pivot point spaced radially therefrom at opposite ends of the lever;

means pivotally connecting the central fulcrum of each lever to the chassis adjacent each wheel with the first lever pivot point oriented significantly above the second lever pivot point;

link means connecting the output of the steering gear mechanism to the first pivot point of each lever, said link means comprising at least one link extending from the steering gear mechanism output to said lever first pivot point; and a pair of tie rods connecting the wheel assembly steering input points to the adjacent lever second pivot point which is located generally adjacent to the jounce and rebound center of curvature and said tie rod being substantially equal in length to the bounce radius thereby minimizing bump steer;

said steering linkage enabling the steering gear mechanism to be located substantially above the wheel centers so that the area of the vehicle below the steering gear mechanism and between the levers is unobstructed by the steering linkage.

9. The invention of claim 8 wherein said fulcrum axes lie on a plane substantially parallel to the vehicle centerline.

10. The invention of claim 9 wherein said fulcrum axes are substantially horizontal.

11. The invention of claim 10 wherein said levers, tie rods and links all lie in a common plane.

12. The invention of claim 11 wherein said plane is generally perpendicular to the vehicle center line.

13. The invention of claim 7 wherein said fulcrum axes are generally horizontal.

14. In a vehicle having a steering gear mechanism with an occupant controlled output, and a pair of steerable wheel assemblies each rotatable about a steering axis and each having a steering input point radially spaced from said steering axis, the wheel assemblies being suspended from the vehicle chassis by control arm means allowing movement in jounce and rebound relative to the vehicle chassis causing the steering input point to move along a generally arcuate path defining a center of curvature and a bounce radius; a steering linkage comprising, in combination:

a pair of levers, each generally elongated in shape having a central fulcrum axis and a first and second end spaced radially therefrom;

means pivotally connecting the central fulcrum axis of each lever to the chassis adjacent each wheel assembly with the fulcrum axes oriented horizontally and parallel to the vehicle center line;

a pair of links each having two ends, one end pivotably attached to the output of the steering gear mechanism and the other end pivotally attached to the lever first pivot point, the movement of said links during steering being confined within a small tubular shaped envelope which is independent of jounce and rebound thereby providing optimum usage of vehicle space adjacent the steering linkage; and means for connecting the steering input point of each wheel assembly to the second pivot point of the a respective lever.

* * * * *